July 22, 1930.  K. E. PEILER  1,770,994

FEEDING MOLTEN GLASS

Original Filed March 17, 1914

Inventor
Karl E. Peiler
by Robson & Brown
Attorney.

Patented July 22, 1930

1,770,994

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

FEEDING MOLTEN GLASS

Original application filed March 17, 1914, Serial No. 825,236. Renewed December 10, 1919, Serial No. 343,813. Divided and this application filed October 19, 1926. Serial No. 142,723.

This application is a division of my copending application filed March 17, 1914, Serial No. 825,236 renewed December 10, 1919 as Serial No. 343,813 and is filed for the purpose of presenting specific claims to one of the forms of the invention disclosed in the original application.

The form of my invention that is to be specifically claimed in the present application, is that shown on Figs. 7 to 10, inclusive of the original application, and includes a rotary mold table which may rotate either continuously or intermittently, the molds on the table being provided with individual guides, in the nature of funnels, for directing mold charges centrally into the molds. The guides or funnels are arranged to be swung over their associate molds, as the molds approach a feeding station where charges of molten glass are delivered to the molds, and thereafter the guides or funnels are swung away from the molds, so as not to interfere with the operations of fabricating the glass in the molds.

The following specification is substantially a reproduction of such parts of the specification of the original application as are necessary for an understanding of the subject matter to be claimed herein.

As stated in the original application, this invention comprises an improved method and apparatus for feeding molten glass in elongated blanks or mold charges suitable for making parisons and for similar purposes.

Figure 1:
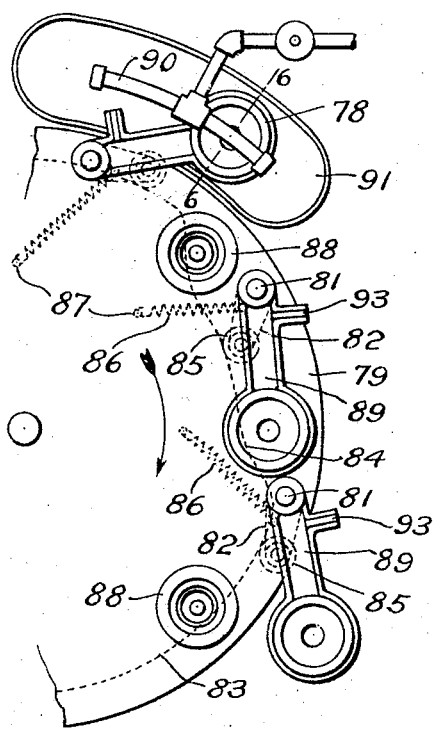
Figure 2:
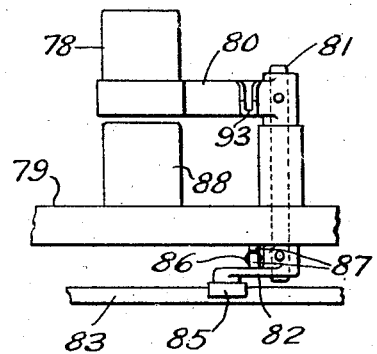
Figure 3:
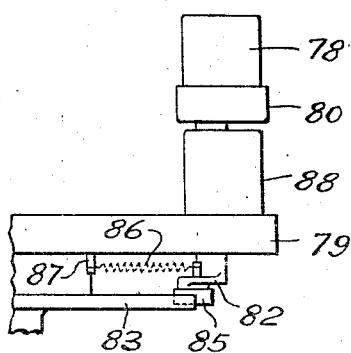
Figure 4:
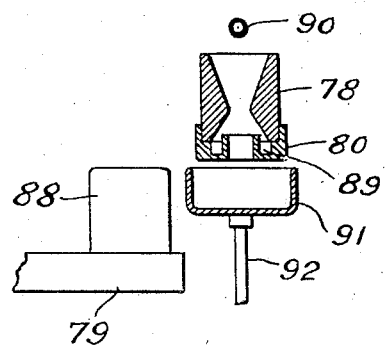

In the accompanying drawings, Fig. 1 is a plan view, and Figs. 2, 3 and 4 are elevational views, showing the application of the invention to be specifically claimed herein, Fig. 4 being shown partly in section taken at the line 6—6 of Fig. 1.

In the adaptation of this invention shown in Figs. 1 to 4 inclusive, the shaping dies or funnels 78 are carried with a rotating mold table 79, being mounted on swinging carriers 80 pivotally mounted on shafts 81 carried by the table, there being one of these funnels or dies for each of the shaping molds carried by the table. The lower ends of the shafts 81 are provided with cam arms 82 bearing against the peripheral edge 84 of a fixed cam 83, which is supported by the column or framing of the machine in any convenient way. The pins or rolls 85 on the cam arms are caused to follow the contour of the cam by means of springs 86 attached between the cam arms and suitable pins 87 under the table.

The dies 78 are sprayed while passing beneath the fixed extended spraying pipe 90, being swung by the cam 83 to their outer positions for this purpose, as shown in Figs. 1 and 4, while passing beneath the spray pipe 90. A suitable fixed trough or drip pan 91 extends beneath the spraying pipe 90, and the pathway of the dies while being sprayed, so as to collect the surplus liquid and conduct it away through the waste pipe 92. The carriers 80 are channeled at 89, or provided with rims to conduct the water from the bases of the dies, out of the spouts 93, which deliver the drip beyond the edge of the table. Ordinarily there will be very little of this drip from the spouts 93, since most of the excess liquid will be caught by the pan 91. If necessary, however, a circular gutter or trough may be arranged below the path of these spouts 93 to catch and conduct away whatever liquid may drip from them.

After being sprayed or otherwise supplied with its lubricating fluid, the die is swung back to its inward position over its mold 88 as shown in Fig. 3 and shown by the position of the middle carrier shown in Fig. 1 whereupon the charge of glass is delivered through the die to the mold, as described briefly hereinafter and in greater detail in my aforesaid original application. The die may then be swung outwardly again as shown at the lower portion of Fig. 1 to allow plungers or other shaping instrumentalities to operate upon the glass in the mold.

In operation, the glass, usually separated beforehand into charges of the required size, is dropped into the upper funnel-shaped receiving end of the die, and settles downwardly by its weight toward and through the contracted neck portion of the die, which attenuates and elongates the charge and imparts to it the cross-sectional contour of the neck, which may be round, or any other desired contour, according to the purposes for which the charge is intended. The film of liquid covering the interior surface of the die serves to lubricate the surface so that the glass slips down readily, without adhering to the die, and also aids in keeping down the heat of the die, not only by absorbing and conducting away the heat of the metal, but also by reason of the more or less heat insulating properties of the film.

The lubricating film, after passing the contracted orifice, is conducted away from the surface of the extruded glass by the downwardly and outwardly flaring surface of the die, while the charge of glass, retaining the attentuated form it receives from the contracted orifice, passes downwardly from the die and falls into the shaping mold below the die.

An important advantage of the present invention is that it enables charges or gathers of glass to be fed in any shape which they may chance to take, from a gathering punty or from a spout or orifice, directly through the shaping dies to the center of a mold, uniformly in the form most desired for subsequent operations, without the necessity for a special shaping operation, and without appreciably chilling or delaying the charges in transit from the melting furnace to the final shaping molds.

Moreover, this method of feeding the charges of glass enables them to be delivered vertically and centrally into the shaping mold, without adhering to or swaying against the side walls of the mold during their delivering movement, as is liable to be the case with the ordinary methods of feeding similar charges of glass from an ordinary feeding spout or orifice, from which the glass, because of its viscous properties, tends to exude more or less irregularly on its different sides, thereby swaying or sagging the charge of glass toward and against the side of the mold. The film coated surface of these shaping dies reduces the friction to a minimum, and makes the friction equal on all sides, so that the charge of glass settles smoothly down through the die and emerges into the shaping mold below in a smooth, uniform column, with a minimum swaying or other irregular movement. The importance of this feature increases with the depth and narrowness of the mold cavities to which the charges are delivered.

In various ways which will occur to those familiar with this art, the invention may be modified and adapted to various purposes and conditions within the scope of the appended claims.

I claim as my invention:

1. The combination with a traveling mold carriage of a mold thereon, a guide mounted on the carriage to travel with the mold, means to swing said guide laterally into position to direct a charge of glass into the mold as the latter passes a charging position, and means to swing the guide away from the mold after passing the charging station.

2. The combination with a traveling mold, of a guide for directing charges of molten glass into the mold, said guide mounted to travel with the mold, and means for periodically swinging the guide into and out of register with the mold.

3. The combination with a rotary mold table, of a series of molds thereon, funnel shaped guides individual to said molds and rotatable with the mold table, and means to automatically move said guides into and out of register with the molds.

4. The combination with a rotary mold table, of a series of molds thereon, guides individual to said molds and rotatable with the mold table, a stationary device operable to move each guide into register with its mold for directing a charge of glass into the mold while the latter passes a charging station, and means to move the guide out of register with the mold when beyond the charging station.

5. The combination of a receptacle and guide being mounted to travel together in a closed path, the guide being in register with said receptacle while passing a charging station for directing a charge of glass into the receptacle, and means to move the guide out of register with the receptacle when the latter has passed the charging station.

6. The combination of a receptacle, means to cause said receptacle to travel in a circular path, a funnel guide traveling with the receptacle, and means for bringing the guide over the receptacle and in register therewith during a portion of its travel, and holding said guide out of register with the receptacle during another portion of its travel.

7. The combination with a series of receptacles, of means for revolving said receptacles about a common center, funnel shaped guides mounted to revolve with the receptacles, means to individually move the guides into position over their respective receptacles and in register therewith for directing charges of glass to the receptacles while the latter are passing a charging station, and means to swing the guides laterally out of register with the receptacles when beyond the charging station.

8. The combination with a continuously rotating mold table or carriage and an annular series of molds thereon, of funnels individual to said molds and mounted on said carriage to rotate with the molds, means to swing each funnel inward to a position over and in register with its mold while the latter is passing a charging station, and means to swing each funnel outward beyond the mold after it has passed the charging station.

9. The combination with a rotary mold table and an annular series of molds thereon, of funnels individual to said molds and mounted to rotate with the mold table, a stationary cam located adjacent the periphery of the mold table and operable to swing each funnel inward to a position over and in register with its mold while the latter is passing a charging station, and means to swing each funnel outward beyond the mold after it has passed the charging station.

10. The combination with a continuously rotating mold table or carriage and an annular series of molds thereon, of funnel guides individual to said molds, swinging arms pivotally mounted on the carriage, funnel guides carried on said arms, a stationary cam adjacent the periphery of the carriage and arranged to swing said arms and move the funnel guides successively into a position over and in register with their respective molds while the latter are passing a charging station, and means to swing each guide outward beyond the mold after it has passed the charging station.

11. The combination with a rotary mold table and an annular series of molds thereon, of guides individual to the molds carried by the table, and means holding the guides over their respective molds as they pass a charging station and outward beyond the molds for the remainder of their travel.

12. In combination, a movable support, a plurality of molds mounted on said support for movement in turn to position to receive a separated charge of glass, a plurality of funnel members pivotally mounted on said movable support, one of said funnel members being associated with each of said molds, and means whereby when a mold approaches the charge-receiving position the corresponding funnel member is disposed in a position over said mold to direct the charge into said mold.

13. In combination, a movable support, a series of blank molds mounted on said support and adapted to be brought in turn, by the movement of said support to position to receive separated gathers of glass, a separate funnel member for each of said molds and movably mounted on said movable support, and means whereby the movement of said movable support positions each of said funnel members over its associate mold as the latter reaches its gather-receiving position.

14. In glass working apparatus, the combination with a series of shaping molds traveling continuously in a closed path, of a guiding funnel associated with each mold for guiding masses of molten glass downwardly and centrally thereinto, said funnel being mounted for movement relatively to its associate mold, and means for moving said molds and funnels to present each mold, with its associated funnel, to the feeding station.

15. In glass working apparatus, the combination of a plurality of shaping molds traveling continuously in a closed path and successively presented at a feeding station and individual funnels for said molds, the said funnels traveling with said molds, and each funnel being movable relatively to its mold to a position over said mold as the mold approaches said feeding station.

16. Means for guiding charges of molten glass comprising a carrier rotating continuously about a stationary axis, guides mounted thereon for radial movement, a cam controlling said radial movement, said cam formed to cause the guides during a portion of their travel to move in the arc of a circle eccentric to the axis of rotation of said carrier, said guides formed to direct charges of glass dropped from a point above to a point below the guides without stopping or materially retarding the movement of the glass.

17. The combination with a traveling mold, of a guide for directing charges of molten glass into the mold, said guide mounted to travel with the mold, means for periodically swinging the guide into and out of register with the mold, and means for spraying said guide with fluid when the guide is out of register with the mold.

18. The combination with a rotary mold table, of a series of molds thereon, funnel shaped guides individual to said molds and rotatable with the mold table, means to automatically move said guides into and out of register with the molds, and means for delivering a fluid spray onto each of said guides after it is moved out of register with its associate mold.

19. The combination with a rotary mold table, of a series of molds thereon, funnel shaped guides individual to said molds and rotatable with the mold table, a fixed spray pipe adjacent to the mold table, means for moving each of said guides periodically to position to be sprayed with a liquid from said pipe, and a drip pan for receiving excess liquid from the guide at the spraying station.

20. The combination with a rotary carrier and a plurality of molds carried thereby and arranged to be brought successively by the rotation of the carrier to position to receive a charge of glass at a charging station, of a guide for each mold, said guide being in register with its associate mold while passing the charging station for directing a charge of glass into the mold, and means of effecting a relative oscillatory movement between the guide and its associate mold after said charge of glass has been delivered to the mold.

Signed at Hartford, Conn., this 18th day of October, 1926.

KARL E. PEILER.